United States Patent
Wiens et al.

(10) Patent No.: US 10,894,734 B1
(45) Date of Patent: Jan. 19, 2021

(54) SYSTEMS AND METHODS OF MANUFACTURING COLORED BOROSILICATE GLASS

(71) Applicant: Molten Aura Labs, LLC, Asheville, NC (US)

(72) Inventors: Adam Wiens, Asheville, NC (US); Aaron Wiens, Asheville, NC (US)

(73) Assignee: Molten Aura Labs, LLC, Asheville, NC (US)

( * ) Notice: Subject to any disclaimer, the term of this patent is extended or adjusted under 35 U.S.C. 154(b) by 206 days.

(21) Appl. No.: 16/190,387

(22) Filed: Nov. 14, 2018

(51) Int. Cl.
| | |
|---|---|
| *C03C 1/10* | (2006.01) |
| *C03C 3/089* | (2006.01) |
| *C03C 3/091* | (2006.01) |
| *C03B 5/18* | (2006.01) |
| *C03B 5/173* | (2006.01) |
| *C03C 3/087* | (2006.01) |
| *C03C 4/02* | (2006.01) |

(52) U.S. Cl.
CPC ............... *C03B 5/18* (2013.01); *C03B 5/173* (2013.01); *C03C 1/10* (2013.01); *C03C 3/087* (2013.01); *C03C 3/091* (2013.01); *C03C 4/02* (2013.01); *C03C 2203/10* (2013.01)

(58) Field of Classification Search
CPC ........... C03C 1/10; C03C 1/105; C03C 3/089; C03C 3/091; C03C 3/093
See application file for complete search history.

(56) References Cited

U.S. PATENT DOCUMENTS

| | | | | |
|---|---|---|---|---|
| 3,561,985 | A * | 2/1971 | Hagedorn | C03C 8/14 501/66 |
| 3,810,745 | A * | 5/1974 | Hagedorn | C03C 1/105 65/134.3 |
| 5,258,336 | A * | 11/1993 | LaMastro | C03C 3/091 501/66 |
| 8,746,012 | B2 * | 6/2014 | Bauer | C03C 1/00 65/376 |
| 2015/0266768 | A1 * | 9/2015 | Dejneka | C03C 3/085 65/30.14 |

* cited by examiner

*Primary Examiner* — Karl E Group
(74) *Attorney, Agent, or Firm* — NK Patent Law

(57) ABSTRACT

The subject matter described herein includes a method of manufacturing colored borosilicate glass including, preparing a raw material composition to form a homogenous powdered mixture, placing the homogenous powdered mixture in a container, heating the mixture to a temperature of 2500-3000° F., charging the container with additional homogenous powdered mixture until the container is full, melting the homogenous powdered mixture until it forms molten borosilicate glass, and refining the molten borosilicate glass between 2800-3200° F. to allow air to escape and the glass to fully homogenize.

4 Claims, No Drawings

SYSTEMS AND METHODS OF MANUFACTURING COLORED BOROSILICATE GLASS

TECHNICAL FIELD

The presently disclosed subject matter is directed towards systems and methods of manufacturing colored borosilicate glass. Specifically, the presently disclosed subject matter is directed towards manufacturing 33CTE-compatible borosilicate colored glass and other types of materials, and more particularly relates to the incorporation of transition metals, post-transition metals, metalloids, and lanthanoids into novel compositions of flame-workable borosilicate glass for use as an industrial or artistic medium, or as pigments for use in plastics, paints, cosmetics, coatings, glass enamels and other materials.

BACKGROUND

Pigments are commonly used in various substances such as paints, inks, plastics, rubbers, ceramics, enamels and glasses. Particularly with glass, unique colors are highly sought after by glassblowers and other artists who are facing increased competition from cheap, imported glass from abroad. The ability of glassblowers to distinguish their products from inexpensive, imported glass is paramount to their success. There are some colors within glass that are more difficult to create than others. For some colors, during the manufacturing process, there is only a short window of time during which reactants can be heated and processed before the color is lost. In some instances, if the reactants are not heated at precisely the correct temperature, for precisely the correct period of time, the desired color can be spoiled (overdeveloped) or not show up at all (underdeveloped).

Traditional methods for manufacturing colored boro silicate include grinding clear borosilicate glass (typically SIMAX®) into a powder, adding coloring compounds to the powder, melting the mixture of ground borosilicate glass powder and coloring compounds in a crucible at approximately 2400 degrees Fahrenheit, then processing the molten mixture into rods or tubes.

One problem with this method is that borosilicate is very viscous, and it is nearly impossible to achieve optically clear, air-free glass at these temperatures. Another problem is that only a small amount of oxides are soluble at these temps, and even small additions can cause CTE incompatibility. CTE incompatibility can occur when fusing multiple types of colored, borosilicate glass with differing CTE values. The colors that result from this method are either very weak but compatible, or stronger, brilliant colors, but incompatible because of an excess of colorants. Additionally, some colors do not develop at all below 2700° F.

The three most common types of commercially available glass are soda-lime silicate, phosphates, and borosilicate. Soda-lime silicate is composed primarily of $SiO_2$, $Na_2O$, and $CaO$. Soda-lime silicate has low thermal shock resistance and average chemical resistance. It is traditionally used in windows and food and beverage containers. Soda-lime silicate is inexpensive to manufacture and melts at a lower temperature than most glass compositions.

Phosphates are composed primarily of $P_2O_5$. They have low thermal shock resistance and generally speaking have low chemical resistance. Phosphates are used in optical fibers and heat absorbers. Phosphate glass is well suited for using with various colorants including transition metal ions and rare earth oxides.

The primary components of borosilicate are $SiO_2$ and $B_2O_3$. Borosilicate has high shock resistance and also high chemical resistance. This makes it ideal for use in industrial equipment, exterior lighting, laboratory equipment, and kitchen glassware. PYREX® is an example of a borosilicate glass.

Clear borosilicate (e.g. PYREX®, DURAN®, SCHOTT®, etc.) has been used for laboratory use and cookware for over a century owing to its chemical inertness, resistance to thermal shock, and overall durability. Its applications have broadened over the years to include mirrors, lenses, protective glass surfaces, and other functional and artistic forms.

The manufacture and use of colored borosilicate is much more recent. Borosilicate is extremely difficult to manufacture because of the temperatures required and the highly corrosive nature of the glass in its liquidus state. Temperatures to make a simple, clear borosilicate are around 3000° F., requiring expensive high temperature furnaces, advanced crucible or tank refractory material, and temperature resistant tools such as stir rods and skimmers.

Presently, the vast majority of colored glass is being made using pre-made clear borosilicate glass that is ground to a powder and mixed with standard glass colorants (oxides of cobalt, manganese, silver, etc.). This mixture is blended and then re-melted in ceramic-style temperature kilns, typically only reaching temperatures of 2350-2450° F. This doped glass melt is stirred and melted over the course of two to five days and processed into rods, tubes, and frit for use in glass art.

The presently disclosed subject matter provides improved systems and methods of manufacturing colored glass that overcome the disadvantages of the prior art. In particular, achieving strong colors, and air-free glass, while maintaining proper compatibility.

SUMMARY

This summary is provided to introduce, in a simplified form, concepts that are further described in the following detailed descriptions. This summary is not intended to identify key features or essential features of the claimed subject matter, nor is it to be construed as limiting the scope of the claimed subject matter.

Disclosed herein is a method of manufacturing colored borosilicate glass including, preparing a raw material composition to form a homogenous powdered mixture, placing the homogenous powdered mixture in a container, heating the mixture to a temperature of 2500-3000° F., charging the container with additional homogenous powdered mixture until the container is full, melting the homogenous powdered mixture until it forms molten borosilicate glass, and refining the molten borosilicate glass between 2800-3200° F. to allow air to escape and the glass to fully homogenize.

According to one or more embodiments, the container is a crucible.

According to one or more embodiments, preparing includes ball milling.

According to one or more embodiments, the charging is carried out in intervals of 1-2 hours.

According to one or more embodiments, the method includes reducing the temperature to 2100-2600° F. to process the glass into a finished material.

According to one or more embodiments, the refining occurs for a duration of 1-2 hours.

According to one or more embodiments, the melting occurs for a duration of 8-12 hours.

According to one or more embodiments, the raw material composition is selected from the group consisting essentially of sand, silica flour, boric acid, borax, alumina, cryolite, nepheline syenite, feldspar, pyrophyllite, minspar, spodumene, kaolin, sodium carbonate, sodium nitrate, sodium chloride, nepheline syenite, feldspar, sodium selenite, potassium carbonate, potassium nitrate, potassium chloride, nepheline syenite, feldspar, lithium carbonate, spodumene, beryllium oxide, magnesium carbonate, magnesium oxide, dolomite, calcium carbonate, fluorspar, calcium phosphate, barium carbonate, barium nitrate, zinc oxide, zinc carbonate phosphoric acid, sodium tripolyphosphate, calcium phosphate, phosphorus pentoxide, cryolite, fluorspar, germanium dioxide, sulfur, cadmium sulfate, zinc sulfide, sodium chloride, potassium chloride, titanium dioxide, ilmenite, vanadium sesquioxide, chromium oxide, potassium dichromate, sodium dichromate, manganese carbonate, manganese dioxide, iron oxide, ilmenite, iron sulfide, cobalt oxide, cobalt carbonate, nickel oxide, nickel carbonate, copper oxide, copper carbonate, sodium selenite, zinc selenate, tellurium oxide, strontium carbonate, tin oxide, yttrium oxide, zirconium oxide, zircopax, molybdenum trioxide, molybdenum sulfide, silver oxide, silver nitrate, silver chloride, cadmium oxide, cadmium sulphate, tantalum oxide, tungsten chloride, sodium tungstate, gold chloride, red lead oxide, bismuth oxide, lanthanum oxalate, lanthanum oxide, cerium oxide, praseodymium oxide, neodymium oxide, samarium oxide, europium oxide, terbium oxide, dysprosium oxide, holmium oxide, erbium oxide, uranium dioxide, and mixtures thereof.

According to one or more embodiments, heating the mixture occurs at a range of 2650-2850° F.

According to one or more embodiments, reducing the temperature occurs at a range of 2200-2500° F.

According to one or more embodiments, the finished material is one or more of rods, tubes, slabs, and cullet.

According to one or more embodiments, the crucible comprises at least 90% alumina.

According to one or more embodiments, the colored borosilicate glass is 33 Coefficient of Thermal Expansion (CTE) compatible colored borosilicate glass.

According to one or more embodiments, a raw material composition for making 33CTE-compatible colored borosilicate glass, includes, by weight percent, 72-76% silica, 10-14% boric acid, 6-10% nepheline syenite, 0-3% barium carbonate, 0-3% potassium carbonate, 0-1% potassium chloride, 0-3% sodium carbonate, 0-1% sodium chloride, and 0-1% potassium dichromate.

According to one or more embodiments, the raw material composition includes copper carbonate.

According to one or more embodiments, the raw material composition includes cobalt carbonate.

According to one or more embodiments, the raw material composition includes cerium oxide.

According to one or more embodiments, a method of manufacturing colored borosilicate glass finished material includes preparing a raw material composition to form a homogenous powdered mixture, wherein the raw material composition comprises: Silicon monoxide, Oxoboryl, Aluminum monoxide, Barium carbonate, nepheline syenite, and at least two metal oxides, placing the homogenous powdered mixture in a container, heating the container to a temperature of 2500-3000° F., charging the container with additional homogenous powdered mixture in intervals until the container is full, melting the homogenous powdered mixture for 8-12 hours until it forms molten borosilicate glass, refining the molten borosilicate glass between 2800-3200° F. for at least one hour to allow air to escape and the glass to fully homogenize, and reducing the temperature to 2100-2600° F. to process the glass into the finished material.

According to one or more embodiments, the at least two metal oxides include magnesium oxide and calcium oxide.

According to one or more embodiments, the at least two metal oxides include potassium oxide and sodium oxide.

According to one or more embodiments, the at least two metal oxides include potassium oxide, sodium oxide, and lithium oxide.

DETAILED DESCRIPTION

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions should not be considered in a limiting sense, as it is understood that the present invention is in no way limited to only the embodiments illustrated.

Any dimensions expressed or implied in these descriptions are provided for exemplary purposes. Thus, not all embodiments within the scope of the descriptions are made according to such exemplary dimensions.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the presently disclosed subject matter.

At least one embodiment of the presently disclosed subject matter is illustrated throughout the summary and description. Disclosed herein is a method of producing colored borosilicate glass. The method includes ball milling raw materials to form a homogeneous powdered mixture. The raw materials may be prepared by ball milling, or they may be prepared by a grinding mechanism and/or a large mixing device. An industrial scale mixer may be used to prepare the raw materials faster, and in larger quantities, with no balls required.

The raw materials may be selected from the materials listed in Tables 1 and 2 below. The homogenous powdered mixture is then placed in a crucible. The crucible is heated to 2650-2850° F. A heating element such as a furnace may be used to heat the crucible. It is understood in the art that when a container, such as a crucible, is heated to the desired temperature, the raw material composition being heated may reach a temperature that is 50-150° F. below the temperature of the heating element. As the raw material composition continues to be heated, its temperature will gradually approach the temperature of the heating element.

The rate at which the crucible is heated depends on the material the crucible is made from. For example, if the crucible is made of platinum, it may be heated quickly without risk of cracking the crucible. If it is made of alumina, the crucible must be heated slowly to avoid cracking. The crucible may be made from platinum, zirconium, alumina, or mullite. Additionally, instead of a crucible, a tank furnace may be used. A crucible is one type of container that may be used but a variety of containers are currently known and used in the art that may be employed.

Once the powdered mixture has off-gassed and condensed (or compressed/compacted), the crucible is charged until full. Off-gassing is a process whereby gas between the grains of powder, and gas created by certain compounds (e.g. sodium carbonate and potassium carbonate) burn off and escape from the mixture. Charging involves adding more powdered mixture incrementally and allowing the powder to off-gas and condense before adding more. Usually this is done in intervals of 1 to 2 hours depending on the size of the crucible and the charging temp. The crucible or container can be charged until it is full. Full can be defined as when the container cannot accommodate more powdered mixture, or when enough powdered mixture has been added to produce the desired amount of glass. According to one or more embodiments, the charging temperature is around 2650-2850° F.

Once fully charged, the method also includes leaving the powdered mixture to melt for 8-12 hours at between 2650-2850° F. After the powdered mixture has melted completely, forming molten borosilicate glass, it is then refined or heated at a higher temperature to allow air to escape and the molten borosilicate glass to fully homogenize. According to one or more embodiments, the molten borosilicate glass is refined at temperatures of 2800-3100° F. for 1 to 2 hours. The molten borosilicate glass may also be refined at temperatures of 2800-4000° F. The refining process may take anywhere from 30 minutes to 4 hours or more.

The contents of the crucible are then slowly dropped in temperature to an appropriate temperature for processing into finished material such as rods, tubes, slabs, cullet, etc. The lower temperature used for processing ranges from 2200-2500° F. In the processing step, the glass further cools and hardens as it is slowly removed from the crucible or container.

Various glass compositions and methods of preparing the glass compositions are disclosed herein. The presently disclosed subject matter is directed towards formulation and manufacture of colored borosilicate glasses that are made without the use of pre-made glass product. The homogeneous powdered mixture is melted in furnaces designed and built specifically for melting borosilicates at high temperatures, in small batches, to enable rapid changing of color in a production environment. The presently disclosed subject matter represents a vast improvement over the re-melted doped glass that is currently the standard product for the colored borosilicate industry.

The method currently used in the art to manufacture colored borosilicate glass includes grinding up pre-made clear borosilicate glass, then adding coloring compounds (or "doping") and re-melting the mixture. This frequently results in undesirable traits such as colored glass with a CTE that is not compatible with other glass (for example it is outside the ideal range of 33±1.5 CTE). This old doping method also limits the spectrum and strength of colors that can be produced.

By starting from scratch, the method of the presently disclosed subject matter allows complete control over the composition of the mixture. Controlling the composition of the mixture allows maximization of color saturation and usability with 33CTE compatible borosilicate glass. Generally, glass with a CTE of 33±1.5 can be considered 33CTE-compatible glass. The term 33 CTE is well defined in the art and is generally understood to be $3.3 \times 10^{-6}$ $K^{-1}$. Therefore 33±1.5 CTE is generally understood to be $3.15\text{-}3.45 \times 10^{-6}$ $K^{-1}$. This is the range where borosilicate glass can be considered 33CTE-compatible.

Having complete control over the composition allows minimization of undesirable traits while maximizing color saturation and usability. Adjustments can be made to the base formula that are impossible using the industry standard "doping" method. The methodology of the present disclosure offers new chemistry because the old soda lime glass color recipes do not work with borosilicate, and a typical crucible does not tolerate temperatures much higher than 2500° F. A modified crucible, containing a higher percentage of alumina, allows the crucible to withstand higher temperatures but makes it less resistant to thermal shock. Therefore, a crucible with a higher percentage alumina can be heated to a higher temperature but must be heated more slowly. A crucible does not have to be used, a container capable of withstanding high heat for a prolonged period of time will be sufficient.

The borosilicate glass composition includes silicon dioxide (SiO) in a range from about 60% to 82% by total composition weight; boric oxide (BO) in a range from about 5% to 25% by total composition weight; aluminum oxide (AlO) in a range from about 0.5% to 6% by total composition weight; and the combination of at least two alkali oxides in a range from about 2% to 7% by total composition weight. In addition, the borosilicate glass has a coefficient of thermal expansion (CTE) that is in a range between about $3.25 \times 10^{-6}$ and $3.55 \times 10^{-6}$.

Furthermore, the borosilicate glass composition and variants of the present disclosure are particularly adapted for scientific and artistic glassblowers. The composition resists devitrification from flameworking and can be shaped with the same techniques used with 33 CTE borosilicate standard clear, with which it was designed to be compatible.

According to previously used doping methods, in order to stay within 33±1.5 CTE, to stay compatible with clear borosilicate, the doping method would produce either weaker colors or strong colors that are outside of the desired CTE range.

The 33 CTE clear borosilicate standard (e.g. PYREX®, DURAN®, SCHOTT®) is composed of (analyzed final product glass):
Silica: 81.0%
Boron: 13.0%
Alumina: 2%
Sodium: 3.5%
Potassium: 0.5%

Three examples are provided below of the transparent, colorless base glass according to one or more embodiments of the presently disclosed subject matter. The examples below illustrate the composition of the glass once it has been finished.

EX. 1

Silica: 70-81%
Boron: 8-15%
Alumina: 0-3%
Alkali Metals (sodium and/or potassium and/or lithium): 0-5%
Alkaline Earth Metals (Be and/or Mg and/or Ca and/or Sr and/or Ba): 0-5%

EX. 2

Silica: 79.00%
Boron: 13.00%
Alumina: 1.80%
Alkali Metals (sodium and/or potassium and/or lithium) 4.20%
Alkaline Earth Metals (Be and/or Mg and/or Ca and/or Sr and/or Ba) 2.00%

EX. 3

Silica: 79.0%
Boron: 13.0%
Aluminum: 1.8%
Barium or Magnesium: 1.5%
Potassium: 2.3%
Sodium: 2.4%

The transparent, colorless base glass formula is the starting point, to which other oxides and components are added to colorize the glass. Adding alkaline earth metals preferably barium or magnesium, facilitates the melt by causing silica, alumina, and lanthanoids to be more readily fluxed. These alkaline earth metals also improve the viscosity in the working range. Alumina and silica percentages can be reduced slightly to make room for the addition of these alkaline earth metals. Additionally, increasing potassium and reducing sodium induces the mixed-alkali properties of lower viscosity and stronger resistance to devitrification in the flame. Devitrification is the growth of crystalline structures within or on the surface of glass.

Here is an example of a finished color borosilicate glass composition:

EX. 4

Silica 69-81%
Boron 8-15%
Alumina 0-3%
Alkali Metals 0-5%
Alkaline Earth Metals 0-5%
Transition Metals 0-12%
Lanthanoids 0-8%
Actinoids 0-2%
Halogens 0-1%
Non-Metals 0-0.5%

According to the presently disclosed subject matter, a small, but significant increase in potassium, along with a decrease in sodium correlates to an unexpected reduction in viscosity, particularly at lower temperatures. Borosilicate is by nature a "short" glass, meaning it has a relatively high viscosity in the working temperature range. Therefore anything that can be done to reduce the stiffness of the glass during the forming process, without increasing its coefficient of thermal expansion (CTE), is highly beneficial.

Once oxides are introduced to the mixture, the transparent, colorless base glass formula will need to be adjusted. It will often be necessary to add or subtract components to achieve the desired color. Sometimes the coloring agents themselves add undesirable properties to the finished product. This can be counteracted by adjusting the concentration of other components in the mixture.

In the present disclosure, the terms "formula", "mixture", "recipe", and "composition" may or may not be used interchangeably based on the context. "Raw materials" and "raw material composition" also may also be used interchangeably.

Working Examples

The examples that follow illustrate compositions used to create different colors within glass. The following examples are intended to illustrate various aspects of the presently disclosed subject matter, and are not intended to be limiting in scope.

Example 5 illustrates a mixture used to obtain a flameworkable 33CTE compatible Copper Ruby Borosilicate glass alongside the elemental analysis, by percentage weight, of the finished product.

| EX. 5 | |
|---|---|
| Raw Material | Finished Glass |
| Silica 10,000 g | Silica 78.86% |
| Boric Acid 1,757 g | Boron 13.00% |
| Nepheline Syenite 1,081 g | Alumina 1.86% |
| Sodium Carbonate 346.6 g | Sodium 2.33% |
| Sodium Chloride 13.5 g | Potassium 1.92% |
| Potassium Carbonate 257.7 g | Copper 0.05% |
| Potassium Chloride 66.2 g | Calcium 0.05% |
| Copper Carbonate 10.5g | Barium 1.50% |
| Bismuth Oxide 1.35 g | Bismuth 0.01% |
| Barium Carbonate 261 g | Trace (O, C, Cl, Fe, Mg) 0.42% |

Example 6 illustrates a mixture used to obtain a flame-workable 33CTE compatible Cobalt Blue Borosilicate glass alongside the elemental analysis, by percentage weight, of the finished product.

EX. 6

| Raw Material | Finished Glass |
|---|---|
| Silica 10,000 g | Silica 78.86% |
| Boric Acid 1,756 g | Boron 13.00% |
| Nepheline Syenite 1,081 g | Alumina 1.86% |
| Sodium Carbonate 404.4 g | Sodium 2.58% |
| Sodium Chloride 13.5 g | Potassium 1.67% |
| Cobalt Carbonate 10.7 g | Calcium 0.05% |
| Potassium Carbonate 198.3 g | Barium 1.50% |
| Potassium Chloride 81.1 g | Cobalt 0.05% |
| Barium Carbonate 261 g | Trace (O, C, Cl, Fe, Mg) 0.43% |

Example 7 illustrates a mixture used to obtain a flame-workable 33CTE compatible Topaz colored Borosilicate glass alongside the elemental analysis, by percentage weight, of the finished product.

EX. 7

| Raw Material | Finished Glass |
|---|---|
| Silica 10,000 g | Silica 79.06% |
| Boric acid 2,992 g | Boron 12.50% |
| Nepheline Syenite 1,078 g | Alumina 1.86% |
| Sodium Carbonate 345.7 g | Sodium 2.33% |
| Sodium Chloride 13.5 g | Potassium 1.69% |
| Potassium Carbonate 197.7 g | Calcium 0.05% |
| Potassium Chloride 53.9 g | Cerium 1.00% |
| Potassium Nitrate 86.8 g | Titanium 1.00% |
| Cerium Oxide 134.8 g | Trace (O, C, Cl, Fe, Mg) 0.51% |
| Titanium Dioxide 134.8 g | |

Example 8 illustrates a mixture used to obtain a flame-workable 33CTE compatible Green Opalite Borosilicate glass alongside the elemental analysis, by percentage weight, of the finished product.

EX. 8

| Raw Material | Finished Glass |
|---|---|
| Silica 10,000 g | Silica 75.88% |
| Boric Acid 2,998 g | Boron 12.50% |
| Nepheline Syenite 405 g | Alumina 0.67% |
| Sodium Carbonate 323.3 g | Sodium 1.74% |
| Sodium Chloride 13.5 g | Potassium 1.36% |
| Potassium Carbonate 198 g | Calcium 0.30% |
| Potassium Chloride 54 g | Barium 2.00% |
| Barium Carbonate 347.8 g | Yittrium 2.50% |
| Flourspar 94 g | Lanthanum 2.50% |
| Lanthanum Oxalate 337.5 g | Flouride 0.25% |
| Yttrium Oxide 337.5 g | Chromium 0.02% |
| Potassium Dichromate 10.8 g | Trace (O, C, Cl, Fe, Mg) 0.28% |

Example 9 illustrates a mixture used to obtain a flame-workable 33CTE compatible Transparent Cobalt Blue Borosilicate glass alongside the elemental analysis, by percentage weight, of the finished product.

EX. 9

| Raw Material | Finished Glass |
|---|---|
| Silica 10,000 g | Silica: 79.0% |
| Boric Acid 1,756 g | Boric Acid: 13.0% |
| Nepheline Syenite 1,081 g | Alumina: 1.8% |
| Barium Carbonate 261 g | Barium or Magnesium: 1.5% |
| Potassium Carbonate 198.3 g | Potassium: 1.75% |
| Potassium Chloride 81.1 g | Potassium Chloride: 0.5% |
| Sodium Carbonate 404.4 g | Sodium: 2.3% |
| Sodium Chloride 13.5 g | Sodium Chloride: 0.1% |
| Cobalt Carbonate 10.7 g | Cobalt Oxide: 0.05% |

Examples 5-9 include nepheline syenite which provides alkalis and acts as a flux to lower the melting temperature of a glass mixture, prompting faster melting. Nepheline syenite also supplies alumina to the glass mixture. Alumina provides increased resistance to scratching and breaking, improved thermal endurance, and increased chemical durability. The exact composition of nepheline syenite can vary, according to one embodiment of the presently disclosed subject matter, nepheline syenite is a mixture (wt %) of:
CaO 0.70%
MgO 0.10%
$K_2O$ 4.60%
$Na_2O$ 9.80%
$Al_2O_3$ 23.30%
$SiO_2$ 60.70%
$Fe_2O_3$ 0.10%
LOI (loss on ignition) 0.70%

Turning to Example 9, a wide range of blues can be created using this essential formula. For example, more cobalt can be added and other ingredients removed to get a stronger blue. To create a lighter color blue, less cobalt may be used. A very light tinted blue all the way to almost black can be created simply by varying the amount of cobalt.

Different combinations of elements, derived from various raw materials, can comprise the powdered mixture used to create the colored glass of the presently disclosed subject matter. Table 1 lists various elements, their percentage ranges, and choices of raw materials from which the elements can be derived.

TABLE 1

| Element | Percent Range | Raw Material Forms |
|---|---|---|
| Silicon | 60-82% | Sand, Silica Flour |
| Boron | 5-25% | Boric Acid, Borax |
| Aluminum | 0.5-6% | Alumina, Cryolite, Nepheline Syenite, Feldspar, Pyrophyllite, Minspar, Spodumene, Kaolin |
| Sodium | 1-4% | Sodium Carbonate, Sodium Nitrate, Sodium Chloride, Nepheline Syenite, Feldspar, Sodium Selenite |
| Potassium | 0.5-4% | Potassium Carbonate, Potassium Nitrate, Potassium Chloride, Nepheline Syenite, Feldspar |
| Lithium | 0.1-2% | Lithium Carbonate, Spodumene |
| Beryllium | 0.2-10% | Beryllium Oxide |
| Magnesium | 0.5-4% | Magnesium Carbonate, Magnesium Oxide, Dolomite |
| Calcium | 0.5-4% | Calcium Carbonate, Fluorspar, Calcium Phosphate |
| Barium | 0.5-4% | Barium Carbonate, Barium Nitrate |
| Zinc | 0.1-10% | Zinc Oxide, Zinc Carbonate |
| Phosphorous | 0.1-3% | Phosphoric Acid, Sodium Tripolyphosphate, Calcium Phosphate, Phosphorus Pentoxide |

TABLE 1-continued

| Element | Percent Range | Raw Material Forms |
|---|---|---|
| Fluorine | 0.1-4% | Cryolite, Fluorspar |
| Germanium | 0.5-14% | Germanium Dioxide |
| Sulfur | 0.1-2% | Sulfur, Cadmium Sulfate, Zinc Sulfide |
| Chlorine | 0.01-2% | Sodium Chloride, Potassium Chloride |
| Titanium | 0.1-7% | Titanium Dioxide, Ilmenite |
| Vanadium | 0-4% | Vanadium Sesquioxide |
| Chromium | 0-2% | Chromium Oxide, Potassium Dichromate, Sodium Dichromate |
| Manganese | 0-4% | Manganese Carbonate, Manganese Dioxide |
| Iron | 0-3% | Iron Oxide, Ilmenite, Iron Sulfide |
| Cobalt | 0-1% | Cobalt Oxide, Cobalt Carbonate |
| Nickel | 0-2% | Nickel Oxide, Nickel Carbonate |
| Copper | 0-2% | Copper Oxide, Copper Carbonate |
| Selenium | 0-2% | Sodium Selenite, Zinc Selenate |
| Tellurium | 0-2% | Tellurium Oxide |
| Strontium | 0-10% | Strontium Carbonate |
| Tin | 0-4% | Tin Oxide |
| Yttrium | 0-10% | Yttrium Oxide |
| Zirconium | 0-6% | Zirconium Oxide, Zircopax |
| Molybdenum | 0-7% | Molybdenum Trioxide, Molybdenum Sulfide |
| Silver | 0-1% | Silver Oxide, Silver Nitrate, Silver Chloride |
| Cadmium | 0-2% | Cadmium Oxide, Cadmium Sulphate |
| Tantalum | 0-1% | Tantalum Oxide |
| Tungsten | 0-1% | Tungsten Chloride, Sodium Tungstate |
| Gold | 0-0.1% | Gold Chloride |
| Lead | 0-20% | Red Lead Oxide |
| Bismuth | 0-2% | Bismuth Oxide |
| Lanthanum | 0-10% | Lanthanum Oxalate, Lanthanum Oxide |
| Cerium | 0-10% | Cerium Oxide |
| Praseodymium | 0-10% | Praseodymium Oxide |
| Neodymium | 0-10% | Neodymium Oxide |
| Samarium | 0-10% | Samarium Oxide |
| Europium | 0-10% | Europium Oxide |
| Terbium | 0-10% | Terbium Oxide |
| Dysprosium | 0-10% | Dysprosium Oxide |
| Holmium | 0-10% | Holmium Oxide |
| Erbium | 0-10% | Erbium Oxide |
| Uranium | 0-2% | Uranium Dioxide |
| Indium | 0-4% | Indium Sesquioxide |
| Arsenic | 0-1% | Arsenic Trioxide |
| Antimony | 0-1% | Antimony Trioxide |

Table 2 illustrates additional raw materials that may be used as a source of elements for making the colored glass of the present disclosure.

TABLE 2

| Raw Materials | Elements Derived |
|---|---|
| Silver Nitrate | Silver |
| Silver Oxide | Silver |
| Aluminum Hydrate | Aluminum |
| Aluminum Oxide | Aluminum |
| Kaolin | Aluminum, Silicon |
| Pyrophyllite | Aluminum, Silicon |
| Gold Chloride | Gold |
| Barium Carbonate | Barium |
| Bismuth Oxide | Barium |
| Calcium Carbonate | Calcium |
| Fluorspar | Calcium, Fluoride |
| Dolomite | Magnesium, Calcium |
| Bone Ash | Calcium, Phosphorus |
| Cadmium Oxide | Cadmium |
| Cadmium Sulfide | Cadmium, Sulfur |
| Cerium Oxide | Cerium |
| Cobalt Carbonate | Cobalt |
| Cobalt Oxide | Cobalt |
| Chromium Oxide | Chromium |
| Copper Carbonate | Copper |
| Copper Oxide | Copper |
| Cupric Nitrate | Copper, Nitrogen |
| Copper Sulfate | Copper, Sulfur |
| Dysprosium Oxide | Dysprosium |
| Erbium Oxide | Erbium |
| Europium Oxide | Europium |
| Iron Chromite | Iron, Chromium |
| Iron Oxide | Iron |
| Ilmenite | Iron, Titanium |
| Germanium Dioxide | Germanium |
| Boric Acid | Boron |
| Holmium Oxide | Holmium |
| Phosphorus Pentoxide | Phosphorus |
| Potassium Chloride | Potassium, Chlorine |
| Potassium Carbonate | Potassium |
| Potassium Dichromate | Potassium, Chromium |
| Potassium Nitrate | Potassium, Nitrogen |
| Feldspar | Potassium, Aluminum, Sodium, Silicon |
| Lanthanum Oxide | Lanthanum |
| Lithium Carbonate | Lithium |
| Magnesium Oxide | Magnesium |
| Magnesium Carbonate | Magnesium |
| Manganese Carbonate | Manganese |
| Manganese Dioxide | Manganese |
| Molybdenum Oxide | Molybdenum |
| Molybdenum Disulfide | Molybdenum, Sulfur |
| Molybdenum Trioxide | Molybdenum |
| Cryolite | Sodium, Aluminum, Fluorine |
| Nepheline Syenite | Aluminum, Silicon |
| Borax | Boron, Sodium |
| Sodium Chloride | Sodium, Chlorine |
| Sodium Carbonate | Sodium |
| Sodium Nitrate | Sodium, Nitrogen |
| Sodium Selenite | Sodium, Selenium |
| Sodium Tungstate | Sodium, Tungsten |
| Neodymium Oxide | Neodymium |
| Nickel Oxide | Nickel |
| Nickel Carbonate | Nickel |
| Lead Oxide | Lead |
| Praseodymium Oxide | Praseodymium |
| Sulfur | Sulfur |
| Antimony Oxide | Antimony |
| Selenium Metal | Selenium |
| Silicon Carbide | Carbon |
| Silica | Silica |
| Samarium Oxide | Samarium |
| Tin Oxide | Tin |
| Strontium Carbonate | Strontium |
| Tantalum Pentoxide | Tantalum |
| Terbium Oxide | Terbium |
| Tellurium Oxide | Tellurium |
| Titanium Dioxide | Titanium |
| Vanadium Pentoxide | Vanadium |
| Tungsten Hexachloride | Tungsten, Chlorine |
| Uranium Trioxide | Uranium |
| Yttrium Oxide | Yttrium |
| Zinc Oxide | Zinc |
| Zinc Selenite | Zinc, Selenium |
| Zircopax Plus | Zirconium, Silicon |
| Zirconium Oxide | Zirconium |

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

Particular embodiments and features have been described with reference to the summary and descriptions. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A raw material composition for making 33CTE-compatible colored borosilicate glass, the raw material composition comprising, by weight percent: 72-76% silica; 10-14% boric acid; 6-10% nepheline syenite; 0-3% barium carbonate; 0-3% potassium carbonate; 0-1% potassium chloride; 0-3% sodium carbonate; 0-1% sodium chloride; and 0-1% potassium dichromate.

2. The raw material composition of claim 1, further comprising copper carbonate.

3. The raw material composition of claim 1, further comprising cobalt carbonate.

4. The raw material composition of claim 1, further comprising cerium oxide.

* * * * *